R. INNES.
MOUSE TRAP.
APPLICATION FILED MAR. 2, 1912.
1,149,584.
Patented Aug. 10, 1915.
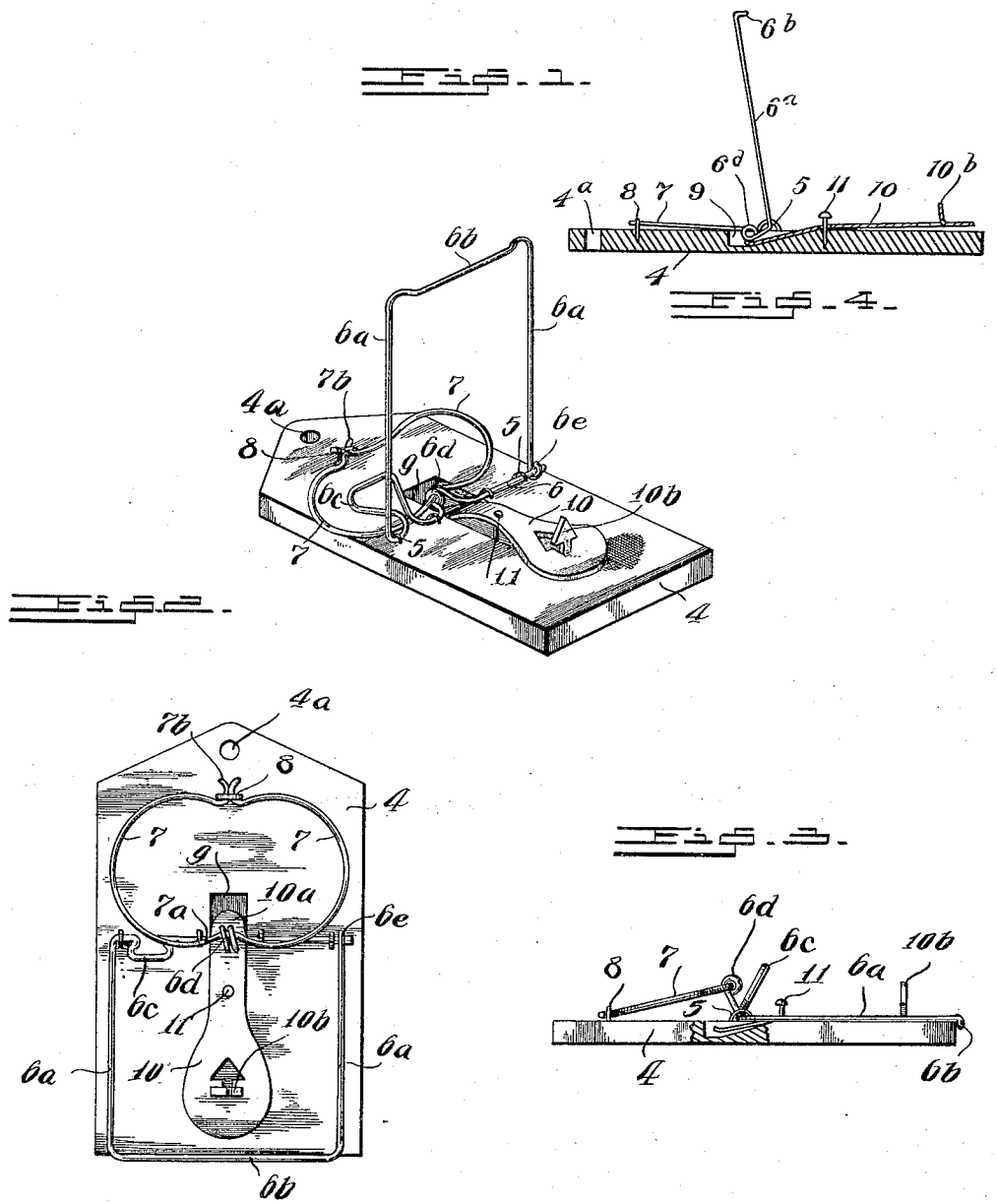

UNITED STATES PATENT OFFICE.

ROY INNES, OF MADISON, SOUTH DAKOTA.

MOUSE-TRAP.

1,149,584. Specification of Letters Patent. Patented Aug. 10, 1915.

Application filed March 2, 1912. Serial No. 681,209.

*To all whom it may concern:*

Be it known that I, ROY INNES, citizen of the United States, residing at Madison, in the county of Lake and State of South Dakota, have invented certain new and useful Improvements in Mouse-Traps, of which the following is a specification.

This invention relates to improvements in mouse traps of the type in which a wire frame is mounted on a suitable base and is held in inoperative position through the instrumentality of a trigger which is adapted to be operated by the animal to be caught.

The especial object of the improvements embodied herein is to produce a trap of the character stated that will be cheap to construct, easily set, quickly and efficiently operated, and that will not be liable to get out of order.

In the accompanying drawing which forms a part of this application, I have illustrated my improved mouse trap by the following views:—

Figure 1 is a perspective view showing my improved trap in set position; Fig. 2 is a plan view of the trap in its "sprung" position, and Fig. 3 is a side view of the trap as shown in Fig. 2.

Referring to the details of the drawing, 4 represents a base made of wood in the rectangular form indicated, with a hole $4^a$ in one end to receive an attaching cord (not shown) or to permit the trap to be hung up on a nail when not in use. 5 represent staples which are driven into the upper side of the base 4 and serve as journals for the wire frame which constitutes the clamping member of the trap. This frame is made up of a single piece of wire having a straight portion 6 lying parallel with the base and embraced by two of the staples 5. The wire is then bent at substantially right angles to the portion 6 to form a crank arm and eye $6^d$ from which the wire extends in a loop $6^c$ on each side of which are other staples 5 which serve as journals for this part of the frame. The side members $6^a$ of the frame are parallel with each other and with the side edges of the base 4 and are connected by a cross member $6^b$, the extremity of the wire being bent to form an eye $6^e$ in which the other extremity of the arm 6 engages.

7 represents the spring member of my improved trap the same consisting of a single piece of wire bent to form the oval loop shown clearly in Fig. 2 and having its mid portion bent inwardly as at $7^a$ to receive the coil $6^d$ of the frame member. The extremities of the spring are bent in opposite directions as at $7^b$ and are engaged by a staple 8 driven into the base 4 at a point opposite the bend $7^a$.

9 represents a recess in the center of the upper side of the base 4 to receive one end of a trigger 10. This trigger is a thin piece of sheet metal having its inner end bent downwardly and upwardly as at $10^a$ and having near its outer end a tongue as $10^b$ punched upwardly therefrom said tongue in the shape of an arrow head. This trigger is loosely mounted on a pin 11 the head of which limits the upward movement of the trigger. The trigger is centered between the side walls of the recess 9 and its downward bent inner end passes under the portion of the frame 6 at which the crank arm coil $6^d$ is formed and the upward bent extremity of said trigger presses against the coil $6^d$ when the trap is in its set position. The arm $6^c$ rests upon the upper side of the spring 7 when the trap is in set position and when the crank is thrown over the center so that the spring can expand, the upward and forward movement of the spring will tend to throw said arm $6^c$ upwardly and as this arm is at right angles to the frame member $6^a$, $6^b$, the latter will be thrown down into horizontal position with the force exerted by the expansion of the spring 7.

The arrow shaped tongue $10^b$ facilitates the attachment of a piece of meat or other bait so that it cannot be readily detached by the mouse without exerting great force. When the trap is in set position the tongue 10 is depressed at its inner end and raised at its outer end so that the action of the mouse in trying to remove the bait on the spur $10^b$ will serve to depress the outer end of the lever sufficiently to throw the crank arm coil $6^d$ off its dead center, it being understood that only a very slight movement of the crank arm is necessary to accomplish this result. The spring 7 in operating the crank not only expands forwardly but has a limited pivotal action in the staple 8 thus raising the forward portion of the spring with the crank arm $6^d$ which it engages.

While I have described my invention particularly as relating to mouse traps, it is apparent that the same principles of construction may be equally applied to larger traps adapted to catch any animal.

It will be noted that the frame which clamps the animal caught is composed of a single piece of wire, that another piece of wire forms the spring and the trigger is made from a piece of flat metal so that my entire trap is composed of but four pieces including the base and not counting the staples and the nail or pin 11. It will also be obvious that the form of spring employed by me while extremely cheap to make is much more effective than the small coil springs frequently used in this type of traps.

Having thus described my invention what I claim as new, is:—

In a trap of the class described, a base member, a frame pivotally mounted on said base having a crank arm at an angle to the plane of said frame and having a second arm at an angle to the plane of said frame, and at one side of said first named crank arm, a spring consisting of a single piece of wire having its ends secured to said base and bent to form a loop the mid portion of said loop engaged by said first named crank arm, said spring also adapted to engage the second crank arm of said frame when released, a trigger mounted on said base having one end adapted to engage said first named crank arm when the opposite end of said trigger is depressed, and means for limiting the movement of said trigger in one direction.

In testimony whereof I affix my signature in the presence of two witnesses.

ROY INNES.

Witnesses:
BEN FRANTSCHY,
AUGUST FISCHER.

Copies of this patent may be obtained for five cents each, by addressing the "Commissioner of Patents, Washington. D. C."